United States Patent [19]
Teitel

[11] Patent Number: 5,999,147
[45] Date of Patent: Dec. 7, 1999

[54] VIRTUAL IMAGE DISPLAY DEVICE

[75] Inventor: Michael A. Teitel, Belmont, Calif.

[73] Assignee: Sun Microsystems, Inc., Palo Alto, Calif.

[21] Appl. No.: 08/980,340

[22] Filed: Nov. 28, 1997

Related U.S. Application Data

[63] Continuation of application No. 08/351,741, Dec. 8, 1994, Pat. No. 5,798,739, which is a continuation of application No. 08/141,204, Oct. 6, 1993, abandoned, which is a continuation of application No. 07/725,032, Jul. 3, 1991, abandoned.

[51] Int. Cl.⁶ ...................................................... G09G 5/00
[52] U.S. Cl. ............................. 345/8; 351/169; 359/631; 359/720; 359/743; 359/853; 345/32
[58] Field of Search ............................ 345/7–9, 32, 151; 351/169; 348/39; 359/504, 505, 630, 631, 712, 720, 742, 743, 853

[56] References Cited

U.S. PATENT DOCUMENTS

| | | | |
|---|---|---|---|
| H423 | 2/1988 | Mohon et al. ........................... | 359/742 |
| 3,860,940 | 1/1975 | Baker ...................................... | 351/169 |
| 4,048,653 | 9/1977 | Spooner ................................... | 345/8 |
| 4,118,761 | 10/1978 | Dey ........................................ | 359/853 |
| 4,220,400 | 9/1980 | Vizenor ................................... | 359/631 |
| 4,261,635 | 4/1981 | Freeman .................................. | 345/7 |
| 4,261,657 | 4/1981 | Reiback ................................... | 353/10 |
| 4,403,216 | 9/1983 | Yokoi ....................................... | 345/9 |
| 4,701,020 | 10/1987 | Bradley, Jr. ............................. | 359/457 |
| 4,869,575 | 9/1989 | Kubik ...................................... | 345/8 |
| 4,932,765 | 6/1990 | Carner, Jr. ............................... | 359/504 |
| 5,013,135 | 5/1991 | Yamamura .............................. | 359/630 |
| 5,130,794 | 7/1992 | Ritchey .................................... | 348/39 |

FOREIGN PATENT DOCUMENTS

| | | |
|---|---|---|
| 57-67457 | 4/1983 | Japan . |
| 2134298 | 8/1994 | United Kingdom . |

*Primary Examiner*—Bipin H. Shalwala
*Assistant Examiner*—Ricardo Osorio
*Attorney, Agent, or Firm*—Conley, Rose & Tayon, PC; B. Noel Kivlin

[57] ABSTRACT

A head-coupled display device for use in presenting electronically generated visual images to a viewer. The device includes a headpiece worn by a viewer, and an image display screen mounted in the headpiece for presenting electronically generated images. A fresnel lens is positioned adjacent the screen for focusing images from the screen at a selected position for viewing as a virtual image. The lens has a set of concentric converging rings whose surface curvatures act to minimize rectilinear distortion of the virtual images perceived by the viewer over the entire field of view of the image.

18 Claims, 3 Drawing Sheets

VIRTUAL IMAGE DISPLAY DEVICE

This is a Continuation, of application Ser. No. 08/351,741 filed on Dec. 8, 1994, now U.S. Pat. No. 5,798,739 which is a Continuation of application Ser. No. 08/141,204 filed Oct. 6, 1993, abandoned, which is a Continuation of Ser. No. 07/725,032 filed Jul. 3, 1991, abandoned.

FIELD OF THE INVENTION

The present invention relates to a virtual image display device.

BACKGROUND OF THE INVENTION

Virtual reality systems are designed to present a user with computer-generated visual, and optionally, auditory cues which allow the user to experience a computer-simulated reality. At the same time, the user may be equipped with a motion-responsive glove or body suit which permits user interaction with the virtual reality information being presented. For example, the user may be able to touch and "move" an object in the visual field, or experience a changing auditory cue as the image of an object in the visual field is moved with respect to the user's ear.

One important application of virtual reality systems is in flight simulators, where visual flight information is provided to a trainee-user. Another is for actual in-flight guidance, where visual cues processed from infrared or radar signals are provided to one of the pilot's eyes. Other applications are emerging, for example in architecture, medicine, engineering, and entertainment, as real-time computer-graphics capabilities are developed.

One desired type of virtual reality system employs a head-mounted display (HMD) designed to be worn by a user, and capable of generating visual images which -are perceived as three-dimensional virtual images. Head-mounted displays for use in flight simulation systems have been proposed. For example, U.S. Pat. No. 4,048,653 describes a head-coupled visual display system which includes a head-mounted unit worn by the observer, and a image projection system for projecting left-eye and right-eye images onto left- and right-eye screens in the head-mounted unit, via an optical train. More recently, the present inventors have described a HMD in which visual images are generated by liquid-crystal display (LCD) screens in a head-mounted unit, and viewed by the observer as three-dimensional virtual images.

In general, it is desirable for an observer to experience a wide-angle virtual image, such that even the peripheral vision of the observer is engaged. One aspect in the design of a wide-angle visual system in an HMD is the requirement for a large-diameter lens having a relatively small focal length. Such lenses can be relatively bulky and expensive. Further, spherical aberration effects associated with spherical glass lenses can produce pronounced rectilinear distortion at the outer regions of the wide-angle image. Heretofore, although a variety of head-coupled image systems have been proposed, none of these has proven capable of achieving distortion-free wide-angle image presentation.

SUMMARY OF THE INVENTION

The invention includes, in one embodiment, a head-mounted display device for use in presenting electronically generated visual images to a viewer. The device includes a headpiece adapted to be worn by viewer, and an image display screen mounted in the headpiece for presenting electronically generated images. A fresnel lens is positioned adjacent the screen for focusing images from the screen at a selected position for viewing as a virtual image which is a selected distance from the viewer's eye. The lens has a set of concentric converging rings whose surface curvatures act to minimize rectilinear distortion of the virtual images perceived by the viewer over the entire field of view of the image. Preferably the device includes such a screen and lens assembly for both left and right eyes, for viewing stereoscopic images.

For viewing images over a wide angle, e.g., 60° or more, the lens is preferably a compound lens includes a pair of fresnel lenses positioned front-to-back. The lens diameter is preferably 60 mm or greater in diameter, and the focal length is preferably 30–50 mm or less.

In one preferred embodiment, the lens is about mid-distance between the display screen and the viewer's eye, in operative condition, and the virtual image produced by the lens is at least about 10 feet in front of the viewer's eye.

Also in a preferred embodiment, the image display screen is a liquid crystal display screen having an array of pixels which make up clusters of RBG pixel groups. The device further includes a partially translucent plate positioned adjacent said screen, effective to blur the distinction between the individual pixel elements in such as RBG pixel cluster.

In a more general aspect, the invention includes an head-coupled image display device for use in viewing electronically generated images as a virtual image. The assembly includes an image display screen for presenting electronically generated images, and a fresnel lens for focusing images from the screen at a selected position for viewing by the viewer as a virtual image which is a selected distance from the viewer's eye. The lens has a set of concentric converging rings whose ring curvatures are designed to produce a desired light-refraction effect, such as reducing outer-field rectilinear distortion over a wide-angle view field. The screen and lens are carried on a head-coupled structure, such as a glasses frame, or a hand-held frame, for positioning the viewer's eye at the near conjugate of the lens.

These and other objects and features of the invention will become more fully apparent when the following detailed description of the invention is read in conjunction with the accompanying drawings.

DETAILED DESCRIPTION OF THE INVENTION

Figure 1:
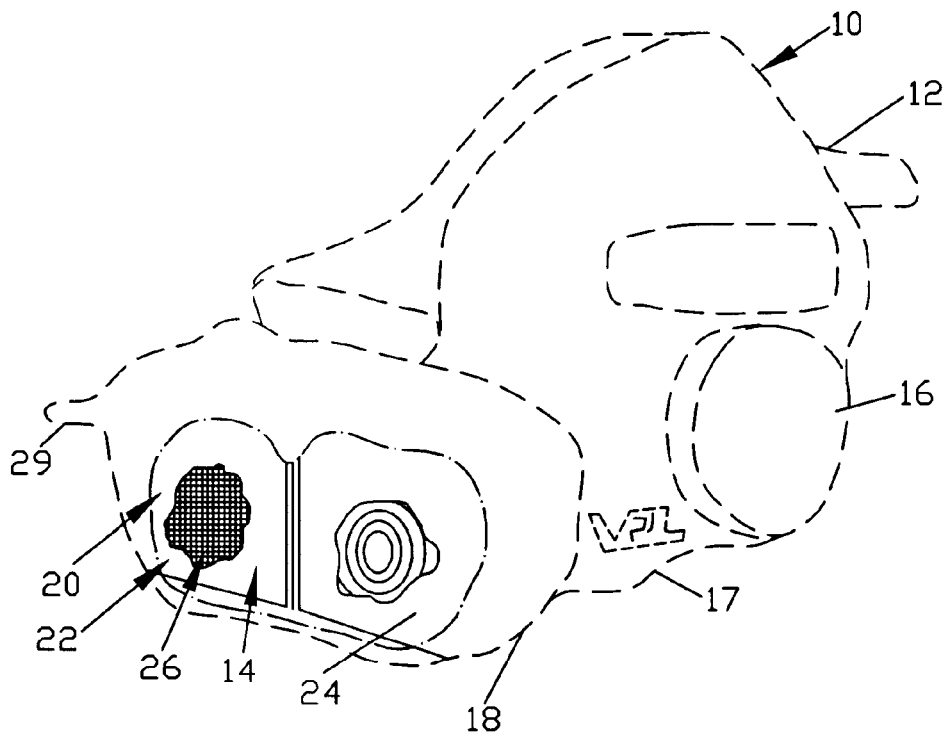
FIG. 1 is a perspective view of a head-mounted display device containing the display optics of the present invention.

FIG. 1 shows a head-mounted display (HMD) or display device 10 constructed according to one embodiment of the invention. The device generally includes a headpiece 12 designed to worn by a viewer, and an optical assembly 14 for producing wide-angle, electronically generated virtual images to each eye of the viewer, as described below. Also shown in the device, although not forming part of the present invention, is a pair of earphones, such as earphone 16, which are used in sending auditory cues, preferably linked to the observed visual images, to the user.

The headpiece includes a frame 17 designed to fit on the viewer's head and a mask 18 which fits over the viewer's eye region. Although the structure used in coupling the optical assembly to a viewer's eye in the FIG. 1 embodiment is a headgear which engages front, back, and sides of the user's head, other types of head-mounted structures, such as a glasses-type frame are contemplated.

In a more general embodiment, the optical assembly is carried on a support structure, such as a desk-mounted support, or a hand-held support which functions to hold the optical assembly at a relatively fixed position with respect to the viewer's eyes, for viewing a virtual image produced by the assembly. For example, a desk-mounted support might include a base mounted on the desk, and a movable arm which is positionable to place the optical assembly, which is carried on the arm, in position for viewing.

Figure 2:
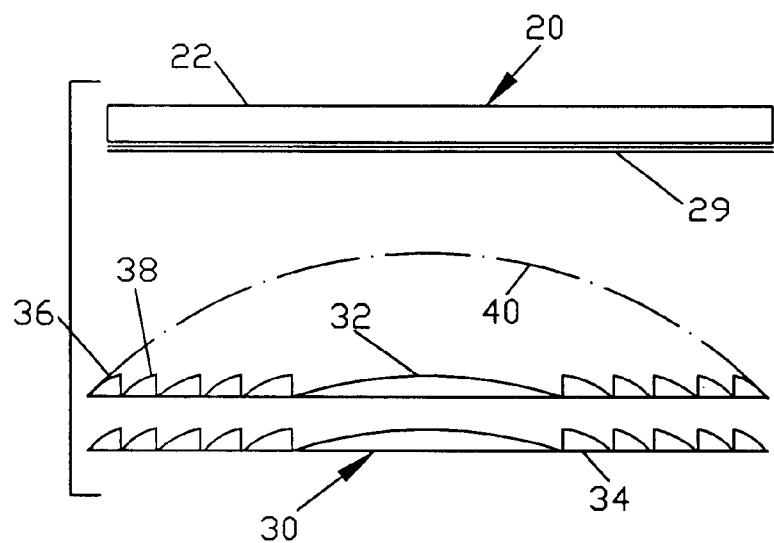
FIG. 2 shows the display optics for one eye in the head-mounted device of FIG. 1.
Figure 3:
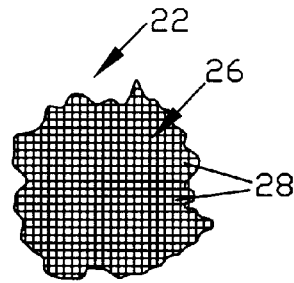
FIG. 3 shows a portion of the face of a liquid crystal display array in the display optics.

With reference to FIGS. 1–3, the optical assembly in the device includes an image display screen 20 mounted in the headpiece for presenting electronically generated images to the viewer. In the embodiment illustrated, the image display screen is produced by a pair of liquid crystal display (LCD) units 22, 24. According to standard construction, each LCD unit includes a source of unpolarized light, a first polarizer, a polarization rotating array (which creates individual pixels), and a second polarizer which serves as an analyzer. (These components are represented by a single plate in the FIGS. 1 and 2).

The cutaway of device 22 in FIG. 1, and FIG. 3, shows an array 26 of pixels, of pixels 28, which form the image display screen for the user's right eye in the device. LCD units having a 62×48 mm square pixel array, and about 102,000 pixels per array are commercially available, such as from Epson (Japan).

Electronically generated images are supplied to the two image screens from a suitable image generator (not shown) connected to the LCD units through a suitable link, such as indicated at 29. The image generator may be, for example, a pair of graphics workstations, such as Silicon Graphics workstations, designed for generating position-dependent images which (a) change to reflect the relative position of the headpiece worn by the viewer, and (b) are reconstructed by the viewer as a three-dimensional image. Such image generators are can be assembled from commercially available work station and graphics software components.

Alternatively, the image screen for presenting electronically created images could be provided by one or a pair of CRT's which may be mounted, for example, at the sides of the headpiece and which project their images via a lens or optical fiber bundle to a suitable viewing screen positioned at the front region of mask 18, or other types of display screens for presenting electronically generated images. Other devices for producing electronically generated images, such as video cameras or the like, are also contemplated.

The screen at which images are presented to the viewer is preferably located in the mask at a position which is about 5–10 cm from the plane of the viewer's pupils. The distance between the screen and the viewer's eyes will be dictated by the optical properties of the lens(es) employed in the optical assembly, and the selected positions of the conjugates in the optical assembly, i.e., the selected focal positions on opposite sides of the lens, as will be described below.

Although the screen in device 10 is positioned directly in front of the viewer, it will be appreciated that any screen configuration which is effective to generate an image in front of the viewer is suitable. For example, the screen may be placed at the top of the mask, with the screen images projected downwardly onto a half-silvered mirror positioned to direct a portion of the image directly toward the viewer's eyes. Such a configuration would allow the viewer to view the electronically generated image as well as to see "through" the image. In this configuration, the fresnel lens described below is preferably positioned between the screen and the half silvered mirror.

Positioned adjacent the viewing side of the LCD device is a slightly cloudy or rough-surfaced film 29 which acts to blur light from individual pixels, and reduce viewer distraction due to individual light array elements seen close to the eye. The ability of the film to blur individual elements is also useful in a color LCD device, for diffusing different color pixels into larger multi-color elements, as will be described below with reference to FIG. 6.

A variety of semi-translucent film material, such as velum, polyethylene sheet material with a slightly roughened surface, or material with an internal light-scattering polymer. The film is preferably 1 to 2 mm from the image screen (pixel array) of the LCD device.

According to an important feature of the invention, the optical assembly includes a fresnel lens, such as the compound fresnel lens shown at 30 in FIGS. 1 and 2. In the embodiment shown, compound lens 30 includes two identical fresnel lens elements, or lenses, 32, 34 which are disposed in a front-to-back arrangement as seen in FIG. 2. That is, the front (upper side) of lens 34 in the figure faces the back (lower side) of lens 32. The purpose of the two-lens configuration is to decrease the focal length of the compound lens by about ½, at a selected lens diameter, to produce a view angle from the viewer's eye of at least about 60°. The two lenses are separated by a distance of about 2–3 mm, with their optical centers aligned. The spacing between the two lens is effective to minimize moire pattern effects from the surface patterns of the two lens.

Figure 4:
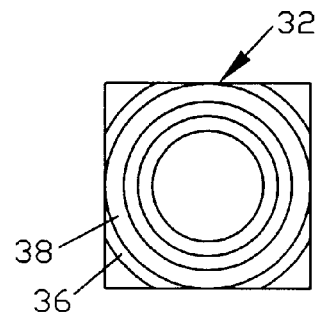
FIG. 4 shows the face of a fresnel lens in the display optics.

Fresnel lens 32, which is representative, will be described with reference to FIG. 2, which shows the lens through a diameter cross section, and FIG. 4, which shows the square lens in planar view. The lens is formed of a series of concentric rings, such as rings 36, 38, whose surface curvatures form a parabolic lens surface, as indicated by dash-dot line 40 in FIG. 2. In this embodiment, the surface curvatures of the lens rings act to reduce rectilinear distortion effects—either pincushion or barrel type distortions—seen at outer regions of optical images formed by spherical lenses, at an infinite conjugate. The effect of lens curvature on rectilinear distortion will be seen below with respect to FIG. 5.

More generally, the lens curvatures are selected to achieve a desired image-ray refraction effect, for producing desired corrections or image effects in the virtual image, at selected regions of the image. In the embodiment illustrated, the lens ring curvatures are corrected for spherical aberrations at an infinite conjugate, i.e., where substantially parallel rays are focused at the lens focal point, and where the near conjugate corresponds to the focal point of the lens. For finite conjugates, different ring curvatures would be required to reduce rectilinear distortion, as will be appreciated from FIG. 5 below. Thus, in a more general case, to correct for rectilinear distortion, the lens ring curvatures are selected to correct for spherical aberration at a given conjugate pair, and the eye is placed at one of conjugates, usually the near conjugate.

Alternatively, the fresnel lens ring curvatures can be selected to correct or compensate refraction effects produced by other lens element in a compound lens. For example, in a compound fresnel lens containing a conventional glass optical element, the fresnel lens ring curvatures may be selected to correct or compensate for spherical aberration effects due to the glass lens element. As defined herein, "fresnel lens" may mean a single fresnel lens, a compound fresnel lens, such as shown in FIG. 2, and a compound lens containing both fresnel lens elements(s) and lens element(s) with continuous surface curvatures, such as standard glass lens elements.

Fresnel lenses having a selected surface curvature (ring curvatures) can be formed conventionally from a master lens formed by optical lathe. Subsequent duplications are prepared readily by embossure or casting processes. Suitable lenses for use in the lens configuration shown in FIG. 2 are available from Fresnel Technologies (Ft. Worth, Tex.), catalog lens no 4.

Each of the fresnel lenses forming the compound lens in the device has a preferred focal length of about 60 mm or less, and a preferred diameter of about 65 mm or greater. As indicated in FIG. 2, the square lens has roughly the same dimensions as the image screen, for receiving and focusing pixel information over the entire array. When the identical two lens are placed in tandem, as illustrated in FIG. 2, the focal length of the compound lens is approximately ½ that of each individual lens, and preferably less than about 50 mm, more preferably about 30 mm or less. At the exemplified lens parameters, i.e., a 65 mm lens diameter and a 30 mm focal length, the field of view is about 90°.

The compound lens is placed in mask 18 with its near conjugate at or near the expected position of the viewer's pupil. The distance between the lens and the image screen is determined by the desired viewing conjugates, i.e., the desired position of the virtual image from the viewer. In the embodiment shown, the image conjugate is the infinite conjugate (at least about 10 feet from the viewer) which is achieved by placing the lens one focal length from the image screen, e.g., about 30 mm. By moving the screen further from the lens, the image conjugate is reduced, having the effect of moving the virtual image closer to the viewer. Although not shown, the mask may be designed to hold interchangeable fresnel lens or lens combinations, to achieve different selected imaging effects with the different lens surface curvatures.

Figure 5:
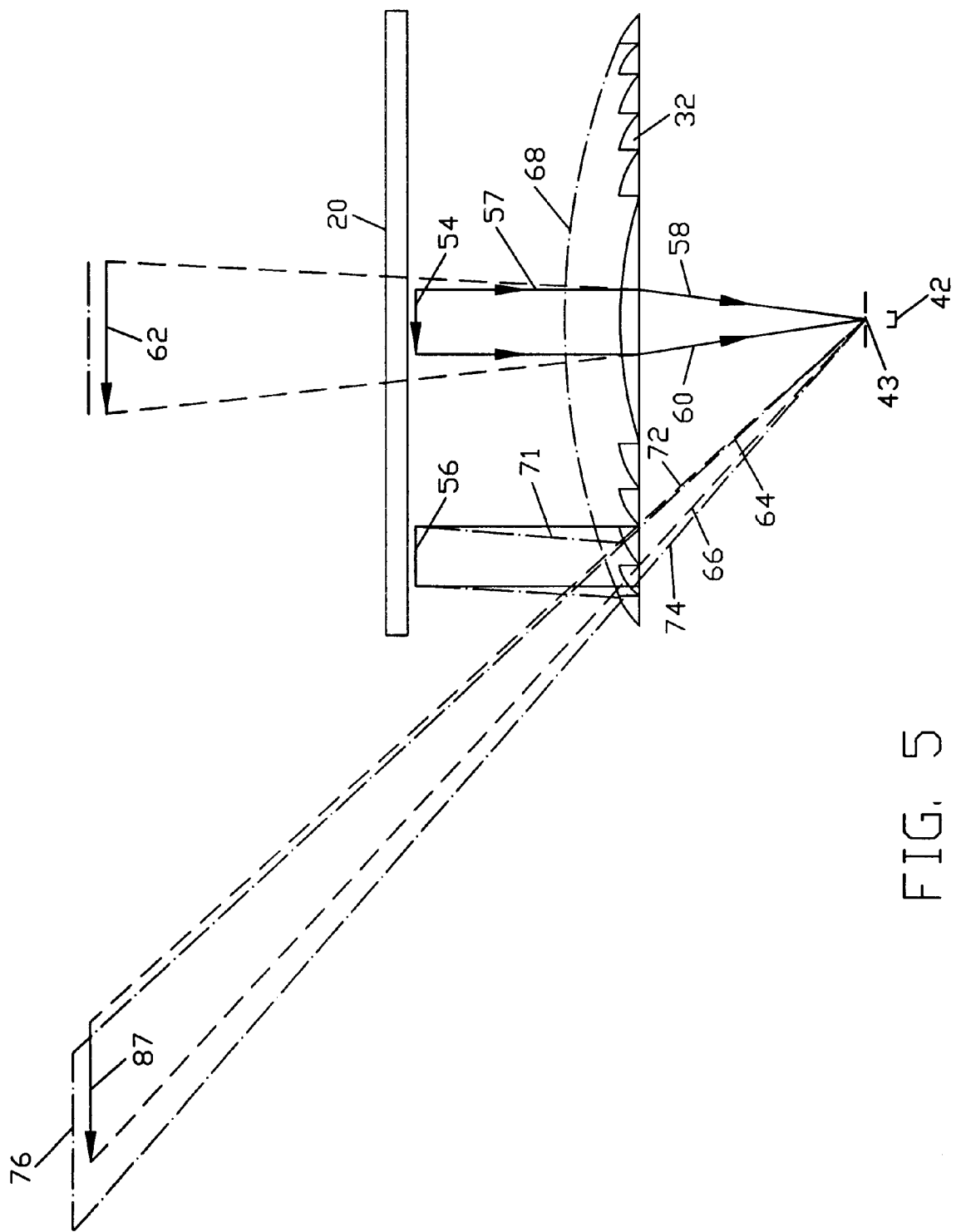
FIG. 5 is a ray diagram illustrating how the fresnel lens assembly illustrated in FIG. 5 acts to reduce rectilinear image distortion at outer-field regions of the image screen.

FIG. 5 illustrates how the optical assembly of the invention focuses an image from the image screen onto the viewer's eye. In the assembly shown, the compound fresnel lens 30 of FIG. 2 has been replaced by a single fresnel lens 32 for simplicity, it being understood that the compound lens functions identically but with one-half the focal length. Also in this assembly, the lens is positioned one focal length from image screen 20, as indicated, for producing a virtual image at least about 10 feet from the viewer.

The figure shows the position of the viewer's eye, where the pupil aperture is indicated by the opening 42. The pupil aperture is typically about 3 mm in diameter, with the focal point of the lens, indicated at 43, being position at the center of the aperture.

According to an important feature of the lens design in the FIG.-1 embodiment, the effective lens ring surface curvatures act to minimize rectilinear distortions which can occur at outer regions of the visual field. This feature is achieved in a fresnel lens whose ring surface curvatures collectively define a parabolic lens surface facing the image screen, and which act to focus onto the viewer's pupil, light rays which are directed substantially normal to the lens surface, as illustrated in FIG. 5.

In the figure, two equal-length arrows 54, 56 are formed by image screen 20 at center and edge regions of the screen, respectively. The light rays making up the center arrow, and indicated at 57, are refracted at the center portion of lens 32, where lens curvature is substantially the same for both spherical and parabolic surfaces. The two converging rays 58, 60 shown focused into the pupil in FIG. 5, represent the chief rays from left and right pixels in the screen which form the rays making up the arrow.

To construct the virtual image perceived by the viewer, the rays 58, 60 are projected, in the present embodiment, to an infinite conjugate, i.e., at least about 10 feet in front of the user, to give a virtual image 62 of the arrow. Similarly, the virtual image constructed from the light rays making up arrow 56, is constructed from refracted rays 64, 66 formed by chief rays striking the lens in a substantially normal direction and refracted into the viewer's pupil, as in FIG. 5. Rays 64, 66, when projected to the infinite conjugate, give the virtual image 67 of the arrow having substantially the same dimensions as image 62 of the center arrow. That is, the perceived rectilinear size of images formed on the screen is substantially independent of the position on the screen where the images are formed.

Also illustrated in the figure is the rectilinear distortion in image size which would occur if outer-field images from screen 20 were focused by a conventional spherical mirror, such as indicated by lens surface 68 in dash-dot lines in the figure. It is assumed here that the spherical aberration produced by a spherical lens would act to focus light rays from outer-field images, and directed normal to the lens surface, at a point closer to the lens than at the true focal length. Accordingly, rays which are focused at the focal point (through the viewer's pupil) would originate from rays which strike the lens at a slightly oblique angle, as shown in dash-dot lines at 71.

When the refracted rays, shown by dash-dot lines 72, 74, are projected to the infinite conjugate, the image 76 of arrow 56 which is formed is substantially longer than image 62 of the center arrow. This type of rectilinear distortion in which outer-field images show distorted enlargement, is known as pincushion distortion. A reverse type of distortion, known as barrel distortion, would occur if aberrations in the lens surface caused outer-field images to be focused behind the actual focal point of the lens.

In the configuration shown, rectilinear distortions are minimized by forming a fresnel lens (or pair of lenses) whose ring curvatures (a) are facing the image screen, and (b) define a substantially parabolic lens surface. Other fresnel-lens surface curvatures would be required to correct for rectilinear distortion in other lens configurations, such as where the lens is used in combination with a glass lens which exhibits spherical aberrations. In the latter case, the fresnel lens ring surface curvatures would be selected to compensate for spherical aberration produced the glass lens, e.g., by a lens ring curvatures which have an exaggerated parabolic curvature in the outer lens rings.

Figure 6:
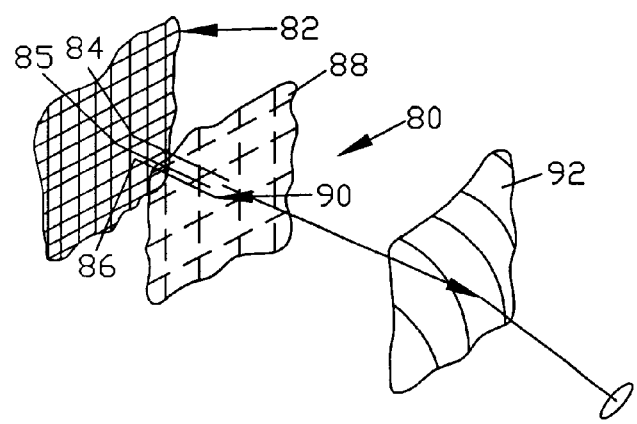
FIG. 6 illustrates how a colored image is produced by the display optics.

FIG. 6 illustrates an optical assembly 80 like that described above, for use in projecting color images to the viewer. The figure shows a portion of an LCD array 82 containing groups of RBG pixels forming three-pixel color groups, such as group 82 formed of pixels 84, 85, 86. A partially translucent or cloudy plate 90 in the assembly, functions, as described above, to blur the distinction between individual pixels in the image screen, and particularly in the present embodiment, to blur the distinction between adjacent different-color pixels, to produce a diffuse color "element", such as indicated at 88 on the plate, which is formed of the three contributing color pixels.

The color elements are focused, as above, by a fresnel lens 90 onto a viewer's pupil, for producing a colored virtual image with minimized rectilinear distortion.

From the foregoing, it will be appreciated how various objects and features of the invention are met. The optical assembly provides a large-diameter, small focal length lens for wide angle viewing. At the same time, the fresnel lens can be designed in lens ring curvatures to eliminate or minimize rectilinear distortion effects, or create other selected image-refraction effects. The invention thus overcomes a limitation in head-coupled display in achieving wide-angle, relatively distortion free image presentation to a viewer. Another important advantage, in a head-mounted device, is the relatively light weight of the lens and lens assembly.

Although the invention has been described with respect to particular embodiments, it will be apparent that various changes and modifications can be made without departing from the invention.

It is claimed:

1. A head-coupled display device for use in presenting electronically generated visual images to a viewer, comprising:
    a headpiece adapted to be worn by the viewer;
    an image display screen mounted in the headpiece for presenting the electronically generated images to the viewer; and
    a fresnel lens mounted in the headpiece for focusing the electronically generated images from the image display screen at a selected position for viewing, wherein one side of the fresnel lens includes a grooved surface, and wherein the fresnel lens is positioned such that the grooved surface is closer to the image display screen than an opposite surface of the fresnel lens.

2. The display device of claim 1, wherein the grooved surface of the fresnel lens includes a set of concentric converging rings facing the image display screen, wherein curvatures of the concentric converging rings are selected to correct for spherical aberration at selected conjugates, one of which is a near conjugate, and wherein the fresnel lens is positioned such that an eye of the viewer is at the near conjugate.

3. The display device of claim 2, wherein the fresnel lens is corrected for spherical aberration at an infinite conjugate, wherein the fresnel lens is positioned midway between the image display screen and the eye of the viewer with a focal point of the fresnel lens configured to correspond to the eye of the viewer.

4. The display device of claim 1, wherein the fresnel lens is a compound fresnel lens, wherein the compound fresnel lens includes a plurality of fresnel lenses each positioned with the grooved surface closer to the image display screen than the opposite surface.

5. The display device of claim 4, wherein the fresnel lens diameter is at least 60 mm, and fresnel lens focal length is no greater than 50 mm.

6. The display device of claim 5, wherein a field of view for the electronically generated images is at least 60°.

7. The display device of claim 1, wherein the image display screen is a liquid crystal display (LCD) screen including an array of pixels which make up clusters of red-green-blue (RGB) pixel groups, and wherein the display device further comprises:
    a partially translucent plate positioned adjacent to the LCD screen, between the LCD screen and the fresnel lens, wherein the partially translucent plate is configured to blur the distinction between the individual pixel elements in the clusters of RGB pixel groups.

8. The display device of claim 1, further comprising a plurality of such image display screens and fresnel lenses, one for each eye of the viewer.

9. The display device of claim 8, wherein each of the plurality of fresnel lenses is a compound fresnel lens, wherein the compound fresnel lens includes a plurality of fresnel lenses each positioned with the grooved surface closer to the image display screen than the opposite surface.

10. An optical device for viewing electronically generated images, comprising:
    an image display screen for presenting the electronically generated images to a viewer;
    a fresnel lens for focusing images from the image display screen at a selected position for viewing, wherein one side of the fresnel lens includes a grooved surface, wherein the fresnel lens is positioned such that the grooved surface is closer to the image display screen than an opposite surface of the fresnel lens; and
    head-coupling means for supporting the image display screen and the fresnel lens at a position for viewing by the viewer.

11. The display device of claim 10, wherein the grooved surface of the fresnel lens includes a set of concentric converging rings facing the image display screen, wherein curvatures of the concentric converging rings are selected to correct for spherical aberration at selected conjugates, one of which is a near conjugate, and wherein the fresnel lens is positioned such that an eye of the viewer is at the near conjugate.

12. The display device of claim 11, wherein the fresnel lens is corrected for spherical aberration at an infinite conjugate, wherein the fresnel lens is positioned midway between the image display screen and the eye of the viewer with a focal point of the fresnel lens adapted to correspond to the eye of the viewer.

13. The display device of claim 10, wherein the fresnel lens is a compound fresnel lens, wherein the compound fresnel lens includes a plurality of fresnel lenses each positioned with the grooved surface closer to the image display screen than the opposite surface.

14. The display device of claim 13, wherein the fresnel lens diameter is at least 60 mm, and fresnel lens focal length is no greater than 50 mm.

15. The display device of claim 14, wherein a field of view for the electronically generated images is at least 60°.

16. The display device of claim 10, wherein the image display screen is a liquid crystal display (LCD) screen including an array of pixels which make up clusters of red-green-blue (RGB) pixel groups, and wherein the display device further comprises:
    a partially translucent plate positioned adjacent to the LCD screen, between the LCD screen and the fresnel lens, wherein the partially translucent plate is configured to blur the distinction between the individual pixel elements in the clusters of RGB pixel groups.

17. The display device of claim 10, further comprising a plurality of such image display screens and fresnel lenses, one for each eye of the viewer.

18. The display device of claim 17, wherein each of the plurality of fresnel lenses is a compound fresnel lens, wherein the compound fresnel lens includes a plurality of fresnel lenses each positioned with the grooved surface closer to the image display screen than the opposite surface.

* * * * *